United States Patent [19]

Harke

[11] Patent Number: 5,003,749
[45] Date of Patent: Apr. 2, 1991

[54] GROUTING ANCHOR TO BE INSERTED IN A PREDRILLED HOLE

[75] Inventor: Alfons Harke, Affligem-Hekelgem, Belgium

[73] Assignee: International Intec Patent Holding Establishment, Vaduz, Liechtenstein

[21] Appl. No.: 481,615

[22] Filed: Feb. 20, 1990

[30] Foreign Application Priority Data

Feb. 20, 1989 [DE] Fed. Rep. of Germany ....... 3905095

[51] Int. Cl.⁵ ................................................ E04B 1/41
[52] U.S. Cl. ........................................ 52/703; 52/704; 52/743
[58] Field of Search .................. 52/703, 704, 743, 744, 52/309.2, 223 L, 303; 411/82, 258

[56] References Cited

U.S. PATENT DOCUMENTS

| | | | |
|---|---|---|---|
| 2,903,877 | 9/1959 | Meade | 52/223 R |
| 3,108,404 | 10/1963 | Lamb | 52/704 |
| 3,564,795 | 2/1971 | Darby et al. | 52/303 |
| 4,063,582 | 12/1977 | Fischer | 411/82 |
| 4,096,672 | 6/1978 | Fischer et al. | 52/127.4 |
| 4,214,416 | 7/1980 | Fischer | 52/704 |
| 4,902,180 | 2/1990 | Gauros | 52/704 |

Primary Examiner—James L. Ridgill, Jr.
Attorney, Agent, or Firm—Antonelli, Terry, Stout & Kraus

[57] ABSTRACT

A grouting anchor to be inserted in a pre-drilled hole (3) comprises a stopper (4) sealing the drill hole at its orifice, this stopper being provided with an inlet opening (6) for the grouting compound.

In order to be able to monitor from the outside the formation of the plug of grouting compound, the stopper (4) is equipped with a backflow opening (7) for grouting compound, this opening terminating into a forward, air-permeable collecting cage (8) which latter, after curing of the grouting compound, can be separated from the stopper (4).

11 Claims, 5 Drawing Sheets

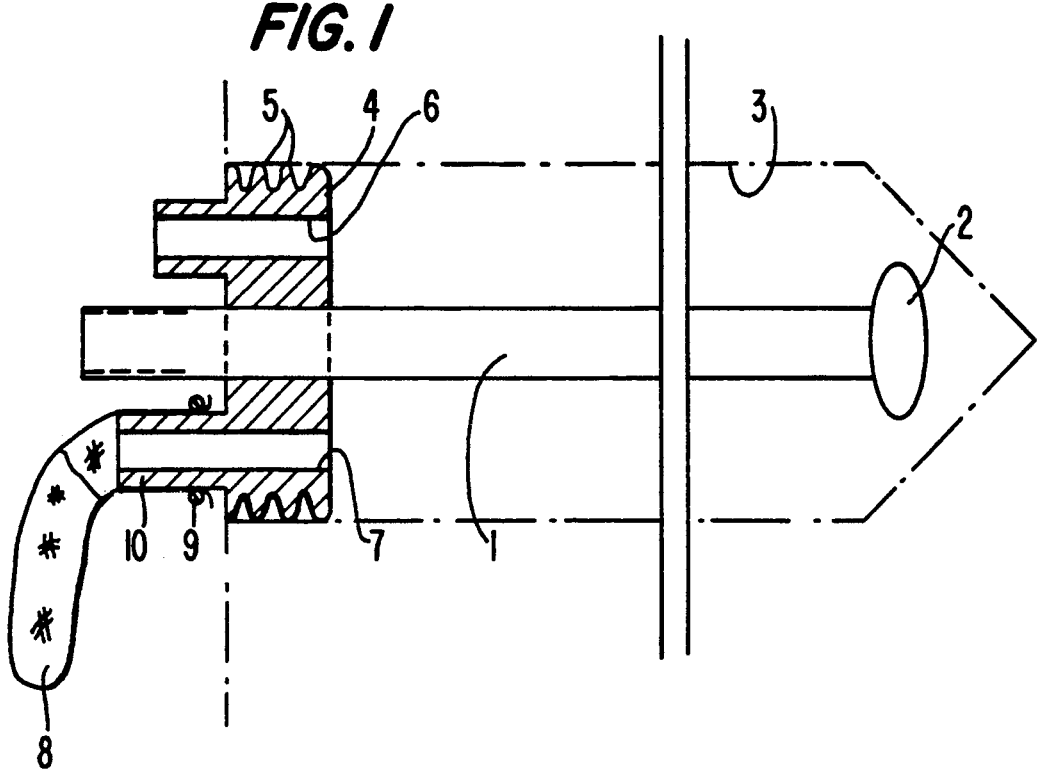
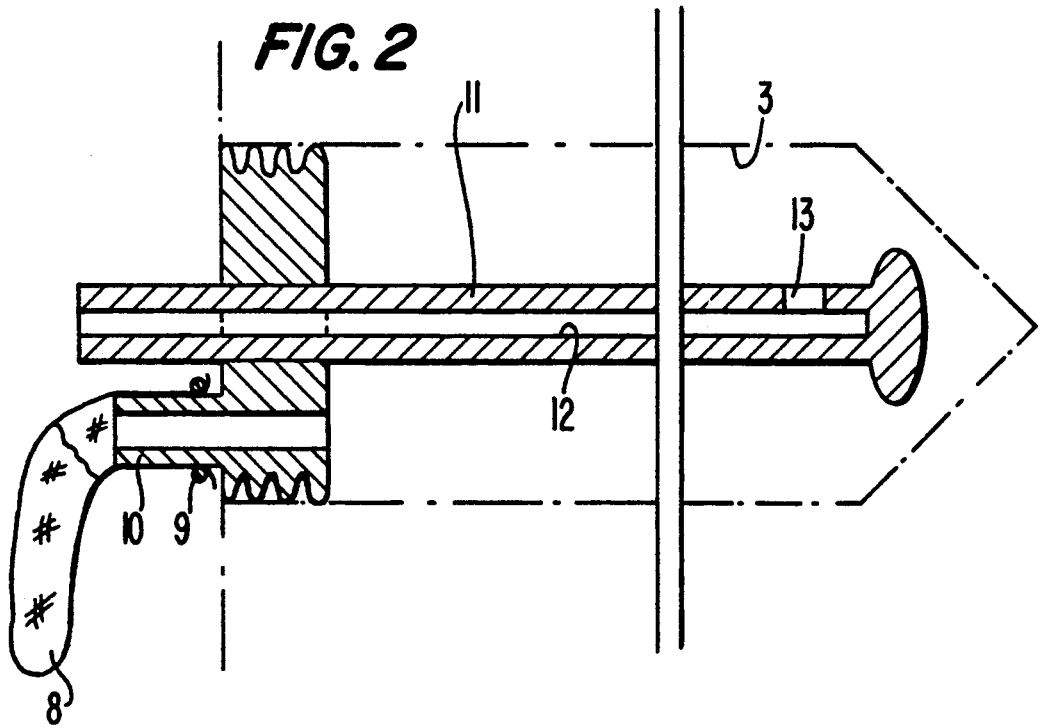

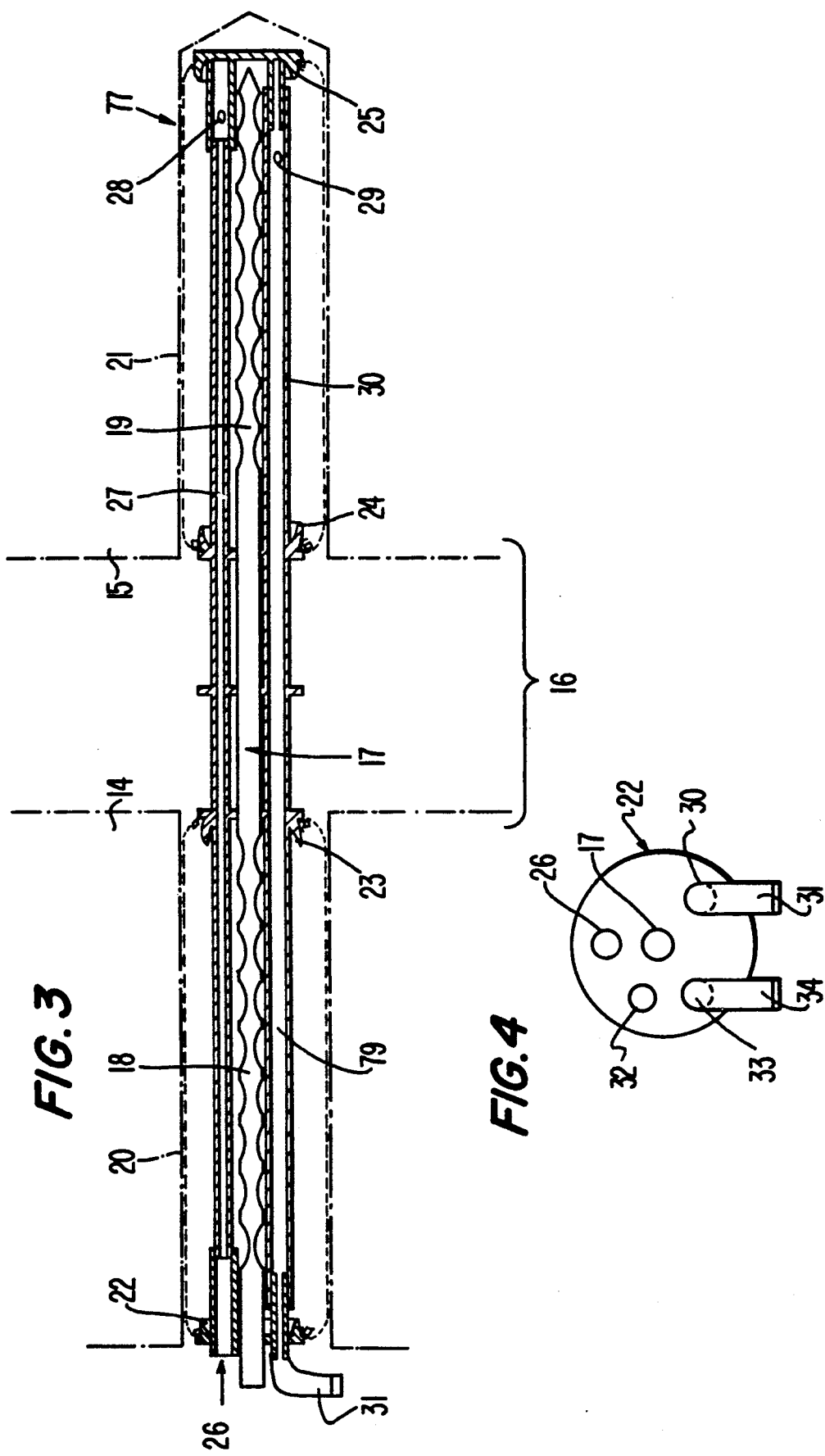

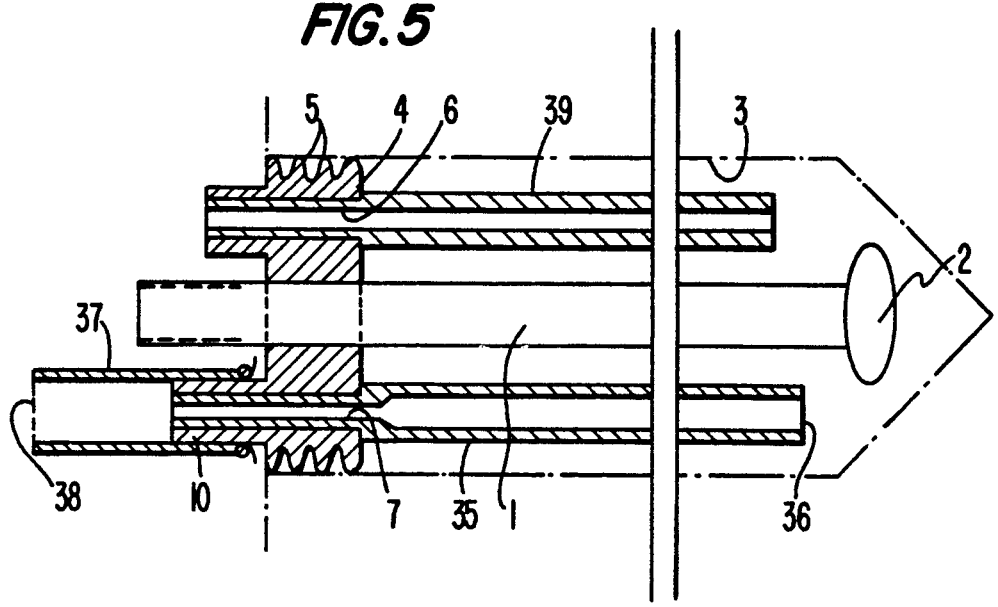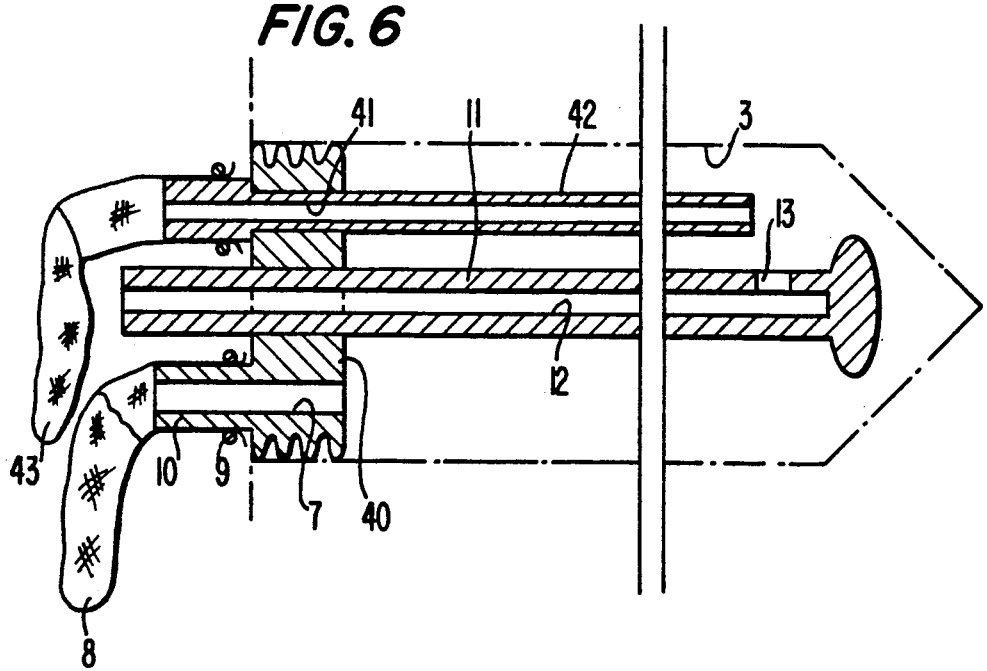

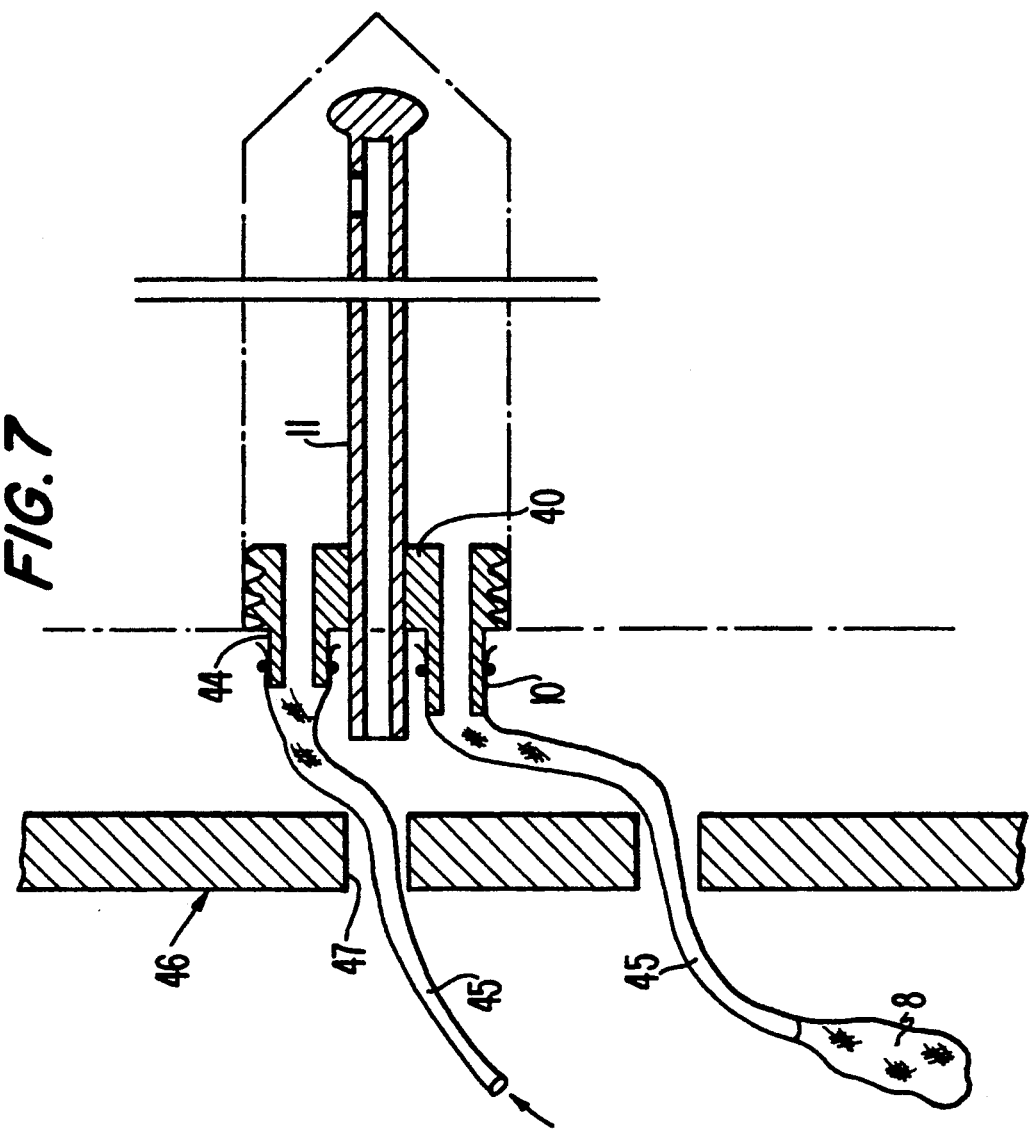

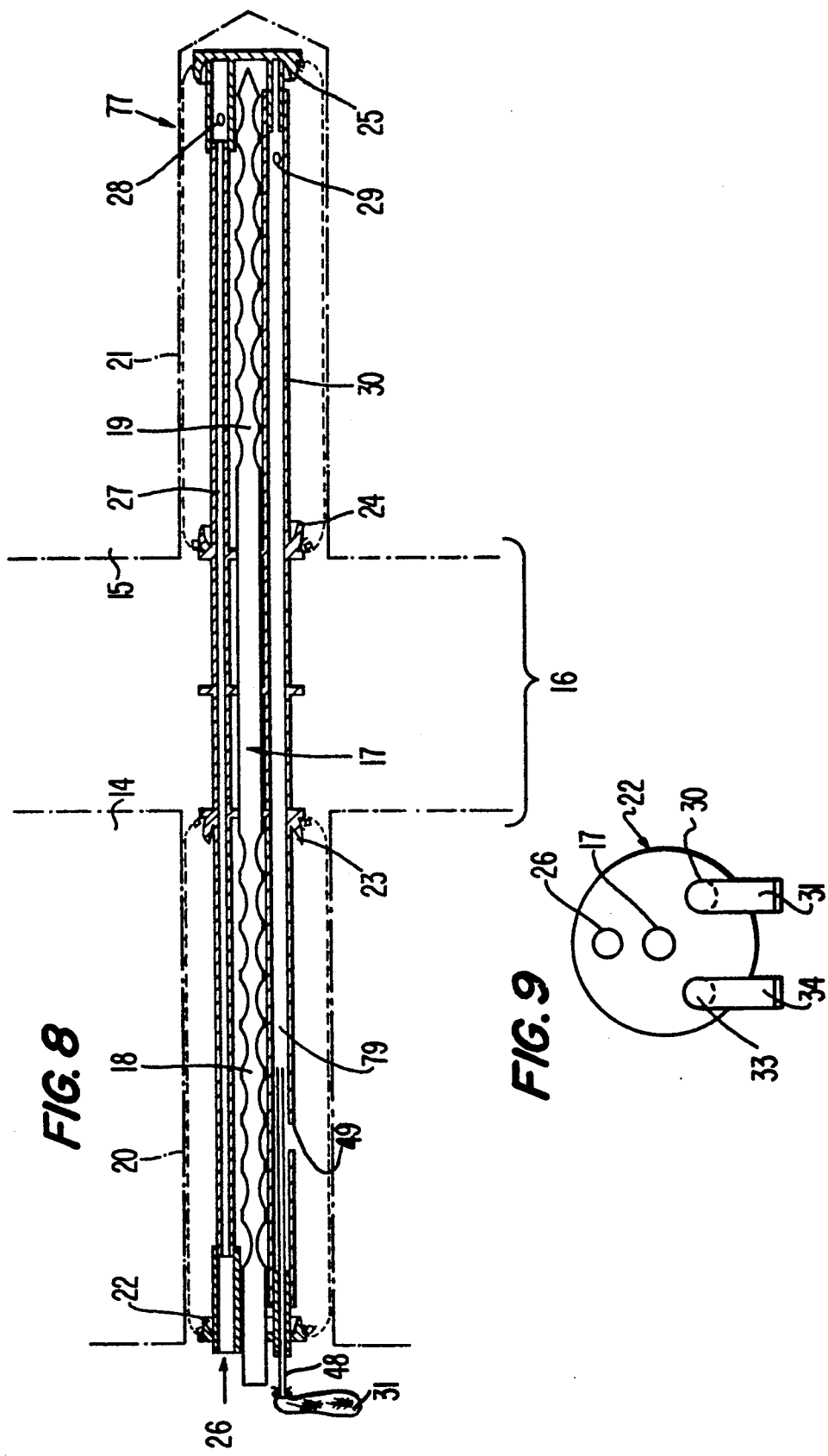

GROUTING ANCHOR TO BE INSERTED IN A PREDRILLED HOLE

BACKGROUND OF THE INVENTION

The invention relates to a grouting anchor to be inserted in a predrilled hole, with a stopper sealing the drill hole at its orifice, this stopper being provided with an inlet opening for the injection compound.

Such grouting anchors are utilized as rock anchors or masonry anchors especially in those cases where the anchoring foundation does not exhibit adequate strength for mechanical anchoring, for example by means of dowels. However, in case of a porous foundation containing cavities or cracks, it is frequently difficult to form a sufficiently solid plug of grouting compound in the predrilled hole. Also with the use of elastically expansible hoses collecting the injection compound in the drill hole it is frequently difficult, or outright impossible, to judge from the outside whether or not adequate injection has taken place.

SUMMARY OF THE INVENTION

The aim underlying the present invention essentially resides in providing grouting anchors of the aforementioned type with an inspection device whereby it is possible to exteriorly monitor and verify a formation of an injection plug in an interior of the drill hole.

This object has been attained according to the invention by providing the stopper with a backflow opening for injection compound, this opening terminating into an air-permeable collecting cage at the front, with the cage being separable from the stopper after curing of the injection compound.

Such a collecting cage initially serves for venting during injection. After the grouting space has been filled, the grouting compound also flows into this frontal collecting cage; the latter fills up with the collecting cage filling with increasing pressure in the injection space and becomes moist on its air-permeable and thus also water-permeable outside. By observing the cage as it is being filled up, and by watching the increase in moisture, conclusions can be drawn with respect to the formation of the grouting plug within the drill hole so that the injection pressure of the grouting compound at the injection pump can be selected correspondingly and injection can be terminated at a specific degree of filling of the forward collecting cage. The collecting cage is separated after curing of the grouting compound and can be stored as means of evidence.

According to the invention, the provision can furthermore be made to equip the backflow opening with a backflow conduit extending into the drill hole, by means of which the grouting compound to be returned into the collecting cage for inspection purposes is obtained from a specific site within the grouting space. Thereby, site-specific information can be gained regarding the formation of the grouting plug. Advantageously, the provision can also be made in this arrangement for the stopper to have several backflow openings, in each case equipped with a collecting cage, grouting compound being conducted into each of these openings from respectively different locations of the grouting space so that information can also be obtained, by means of the collecting cages, with regard to the plug structure prevailing at various sites of the plug.

Preferably, according to the present invention the collecting cages are made of flexible visual inspection hoses whereby the degree of filling can be directly observed optically from the constantly more tautly inflated shape of the hose.

In a further development of the invention, the provision can also be made that, with a grouting anchor to be separately installed in the two shells of a double-shell building wall, two collecting cages are arranged at the frontal drill hole stopper, these cages being connected separately from each other to the respective injection chambers associated with the building shells. It is thereby possible to separately monitor the formation of the plugs of grouting compound in the two building shells.

In accordance with the present invention, the grouting anchor may be provided with two filling conduits, with the first conduit terminating into a grouting space of a rearward building shell and a second of the conduits terminating into the grouting space of the forward building shell, with the backflow conduit terminating in the grouting space of the rearward building shell.

In the last described arrangement, the backflow conduit may be provided with an opening terminating in a region of the grouting space of the forward building shell, with the opening being sealable by a small tube insertable into the backflow conduit and carrying a collecting cage so that, during a step of injecting into the rearward grouting space, control grouting compound flows back into the collecting cage. The small tube is adapted to be removed out of the backflow conduit after filling the rearward grouting space so that the thus vacated forward portion of the backflow conduit constitutes the second filling conduit and is usable for the introduction of grouting compound into the forward grouting space. Advantageously, the grouting anchor is tubular and constitutes the first filling conduit, and the collecting cage may include a sleeve provided with a screen surface. Moreover, the stopper may include a disk attachable tightly to the drill hole orifice, with the disk being provided on the outside with a filling socket and a backflow socket to which are connected extension hoses.

The above and other objects, features, and advantages of the present invention will become more apparent from the following description when taken in connection with the accompanying drawings which show, for the purpose of illustration only, several embodiments in accordance with the present invention.

BRIEF DESCRIPTION OF THE DRAWINGS

FIG. 1 is a schematic partial cross-sectional view of a grouting anchor with a solid steel core and visual inspection hose constructed in accordance with the present invention;

FIG. 2 is a schematic partial cross-sectional view of a grouting anchor constructed in accordance with the present invention with a tubular steel anchor;

FIG. 3 is a partially schematic cross-sectional view of a grouting anchor constructed in accordance with the present invention for a double shell masonry;

FIG. 4 is an end view of a front end of the anchor of FIG. 3;

FIGS. 5 and 6 are schematic partial cross-sectional views of further embodiments of grouting anchors constructed in accordance with the present invention;

FIG. 7 is a schematic partial cross-sectional view depicting the introduction of a grouting compound in a grouting anchor constructed in accordance with the present invention for use in a curtain facade;

FIG. 8 is a schematic cross-sectional view of another embodiment of a grouting anchor constructed in accordance with the present invention for a double shell masonry; and FIG. 9 is a front end view of the grouting anchor of FIG. 8.

DETAILED DESCRIPTION

Referring now to the drawings wherein like reference numerals are used throughout the various views to designate like parts and, more particularly, to FIG. 1, according to this figure, a grouting anchor includes a central solid steel anchor 1 pushed with a thickened end to thereof into a predrilled bore hole 3 and carrying at an opposite end thereof, to be arranged at the opening or orifice of the predrilled bore hole 3, a disk-shaped stopper or barrier 4 of a synthetic resin which seals the predrilled bore hole 3. The stopper 4 is provided along its periphery with selaing fins 5. Furthermore, the stopper or barrier 4 includes an inlet duct 6 for the injection of grouting compound with the grouting compound, after filling up the predrilled bore hole 3, flowing to an increasing extent through a backflow duct 7 in the stopper 4 into a frontal, air-permeable collecting cage. 8 which, in FIG. 7 includes a flexible visual inspection hose attached by a clamping ring 9 to a forward connecting socket 10 of the stopper 4.

In the FIG. 2, the grouting anchor has a tubular steel anchor 11, with the grouting compound being filled into the predrilled bore hole 3 through the inner channel 12 and radial outlet bore 13. From the predrilled bore hole, 3 the grouting compound passes, into the collecting cage 8.

In the grouting anchor of FIGS. 3, 4 for a masonry consisting of two shells 14, 15, separated by an air gap 16. The grouting anchor includes a steel wire anchor 17, corrugated in its anchoring sections; and respectively encludes on two anchoring sections 18, 19, a hose 20, 21 for the formation of separate plugs of grouting compound within the two building or masonry shells 14, 15. The hoses 20, 21 are each tightly clamped with their ends onto stopper or barrier disks 22, 23, 24, 25. In the forward stopper or barrier disk 22, shown in FIG. 4, a first injection opening 26 is provided, connected to a pipe 27 extending into the rearward anchoring section. The grouting compound flows through the radial outlet 28 of the pipe 27 only into a rearward space injection chamber or surrounded by the rearward hose 21. Via the opening 29, a backflow pipe 30 leading to the forward stopper or barrier disk 22 is connected to this rearward injection chamber 77 The backflow pipe 30 terminates into a visual inspection hose 31 located in front of the stopper or barrier disk 22 so that the formation of the grouting plug within the housing shell 15 can be observed from the front. In the forward stopper or barrier disk 22, a second filling opening 32 is furthermore provided for injecting grouting compound into the forward injection space 19 surrounded by the hose 20, with grouting compound flowing from this space via the further backflow opening 33 in the stopper or barrier disk 22 to a separate visual inspection collecting hose 34. The two plugs of compound thus can be formed in succession in the two masonry shells 14, 15 and can be controlled each one separately during their formation.

In the arrangement, of FIG. 5 a backflow conduit 35 is inserted in the backflow opening 7, with the orifice 36 of the conduit 35 lying on the very bottom of the predrilled bore hole 3. A collecting cage 37 is tightly attached to the forward filling nipple 10 of the stopper or barrier disk 4, with the collecting cage 37 encluding a cylindrical sleeve, the outer end face of which is closed off by a fine-mesh, air-permeable screen 38. The sample obtained in the collecting cage 37 yields information on the structure of the plug in the zone of the orifice 36, i.e. in the region of the very bottom of the predrilled bore hole 3. A tubular filling conduit 39 is inserted in the filling opening 6; this conduit 39 likewise extending to the very depth of the predrilled bore hole 3 and ensures that the drill predrilled bore hole 3 is filled with grouting compound from the very bottom thereof toward the front.

In the arrangement of FIG. 6 still another backflow opening 41 is provided in addition to the backflow opening 7 in the forward stopper or barrier disk 40. A backflow conduit 42 extending to the very bottom of the predrilled bore hole 3 is inserted in the backflow opening 41, with the backflow opening 41 being likewise provided with a visual inspection hose 43. Thus, at the visual inspection hose 8, the formation of the plug in the proximity of the drill hole orifice can be monitored and, by the visual inspection hose 43, the plug formation can be controlled in the region of the very bottom of the drill hole.

FIG. 7 shows the possibility of connecting extension hoses 45, 45, if necessary, also to the filling socket 44 and to the backflow socket 10 of the stopper or barrier disk 40, with may be required, for example, if, after insertion of the grouting anchors, first a curtain facade 46 or the like is installed before the grouting is performed. The hoses 45, 45 are pulled through gaps 47 in the curtain facade 46.

In FIGS. 8 and 9, a small tube 48 carrying a visual inspection hose 31 is inserted in the backflow conduit 30 extending up to the rearward injection space within the building shell 15 with the small tube 48 blocking a radial opening 49 of the backflow conduit 30 arranged in the zone of the forward grouting space. During formation of the rearward grouting plug, grouting compound is injected in the manner described above via the first filling opening 26. Compound flows to the visual inspection hose 31 by way of the backflow conduit 30 and the small tube 48. After termination of this grouting step, the small tube 48 is pulled out of the backflow conduit 30 so that the opening 49 is thus vacated. The forward portion of the backflow conduit 30 is then utilized as the second feeding line for filling the forward grouting space, this grouting step being, in turn, observable through the second visual inspection hose 34. In the embodiment, of FIGS. 8 and 9 besides the central opening for the wire anchor 17, only three openings in the frontal stopper 22, are necessary namely, the openings 26, 33 and the opening for the pipe 30, arranged at equidistant angular spacings. The embodiment according to FIGS. 8 and 9 is especially recommended in case the predrilled bore hole 3 has a relatively small diameter and, for example, the diameter of the stopper or barrier disk 22 amounts to merely 16 millimeters.

I claim:

1. Grouting anchor insertable in a predrilled bore hole, the grouting anchor comprising a stopper means for sealing an opening of the predrilled bore hole an inlet opening means provided in said stopper means for receiving a grouting compound, at least one backflow opening means in said stopper means for accommodating the grouting compound, wherein said backflow opening means terminates into an air permeable forward collecting cage adapted to be separated from the means after a curing of the grouting compound.

2. Grouting anchor according to claim 1, wherein the backflow opening includes a backflow conduit means extending into the predrilled bore hole for obtaining the grouting compound to be returned into the collecting cage for inspection purposes from a specific site within a grouting space.

3. Grouting anchor according to one of claims 1 or 2, wherein the stopper means includes a plurality of backflow opening means, each of said backflow opening means including a collecting cage, wherein grouting compound is fed into said plurality of backflow opening means from respectively different locations of the grouting space.

4. Grouting anchor according to one of claims 1, 2 or 3, wherein the inlet opening is connected to a filling conduit projecting into the predrilled bore hole.

5. Grouting anchor according to one of claims 1 or 2, wherein the collecting cage includes a visual inspection hose.

6. Grouting anchor according to one of claims 1 or 2, wherein the collecting cage includes a sleeve provided with a screen surface.

7. Grouting anchor according to one of claims 1 or 2, with the grouting anchor adapted to be anchored separately in the two shells of a double-shell wall, wherein two collecting cages are arranged at the stopper means, said collecting cages being connected separately from each other respectively to grouting spaces associated with the building shells.

8. Grouting anchor according to claim 7, wherein two filling openings are provided in the stopper means respectively communicating with two filling conduits, the first filling conduit terminates in the grouting space associated with a rearward of the building shells and the second filling conduit terminates in the grouting space of a forward of the building shells, and wherein a backflow conduit means communicating with the backflow opening means terminates in the grouting space associated with the rearward building shell.

9. Grouting anchor according to claim 7, wherein a backflow conduit means communicates with the backflow opening means and terminates at one end in the grouting space associated with a rearward of the building shells and, at an opposite end, includes an opening terminating in a region of the grouting space of a forward of the building shells, a small tube means is insertable in the opening of the backflow conduit means for sealing the same and carries the collecting cage such that, during an injecting of the grouting compound into the grouting space associated with the rearward of the building shells grouting compound flows back into the collecting cage, and upon a removal of the small tube means out of the opening of the backflow conduit means after filling the rearward grouting space, the thus-vacated forward portion of the backflow conduit means forms a filling conduit means for enabling an introduction of grouting compound into the grouting space associated with the forward of the building shells.

10. Grouting anchor according to claim 9, wherein the grouting anchor is tubular and forms the filling conduit in communication with the filling opening means in the stopper means.

11. Grouting anchor according to claim 1, wherein the stopper means includes a disk tightly attachable to the opening of the predrilled bore hole, and wherein a filling socket means and a backflow socket means are provided on an exterior of the disk with the socket means being respectively connectable to extension hoses.

* * * * *